United States Patent
Jywe et al.

(10) Patent No.: US 8,477,321 B2
(45) Date of Patent: Jul. 2, 2013

(54) OPTICAL PARALLELISM MEASUREMENT DEVICE

(75) Inventors: Wen-Yuh Jywe, Sinji Village (TW);
Chia-Hung Wu, Wacuo (TW);
Yun-Feng Teng, Douliou (TW)

(73) Assignee: National Formosa University, Yunlin County (TW)

( * ) Notice: Subject to any disclaimer, the term of this patent is extended or adjusted under 35 U.S.C. 154(b) by 252 days.

(21) Appl. No.: 13/102,137

(22) Filed: May 6, 2011

(65) Prior Publication Data
US 2011/0292407 A1 Dec. 1, 2011

(30) Foreign Application Priority Data
May 26, 2010 (TW) ............................... 99116767 A

(51) Int. Cl.
*G01B 11/14* (2006.01)
(52) U.S. Cl.
USPC ......................................................... 356/614
(58) Field of Classification Search
None
See application file for complete search history.

(56) References Cited

U.S. PATENT DOCUMENTS
4,774,405 A * 9/1988 Malin ........................... 250/225

* cited by examiner

*Primary Examiner* — Gregory J Toatley
*Assistant Examiner* — Amanda Merlino
(74) *Attorney, Agent, or Firm* — Chun-Ming Shih

(57) ABSTRACT

A high precision, rapidly operable optical parallelism measurement device includes a light source module, a light beam splitting module and at least two photoelectric detectors. The light source module has a light source and a light beam splitting element such that the light source module is able to produce two light beams perpendicular to each other. One of them is parallel to the moving direction, and is received by one of the detectors, while the other beam is split into two beams perpendicular to each other by the light beam splitting module. One beam is parallel to the former parallel by moving beam and is received by the other detector. With this scheme, the measurement can be performed by means of those perpendicular and parallel light beams without being affected by the structure of the machine platen to cause errors. The device can be manufactured with low cost and high precision. It is very compact in size and easy to carry and build up for rapid measurement.

8 Claims, 4 Drawing Sheets

OPTICAL PARALLELISM MEASUREMENT DEVICE

BACKGROUND OF THE INVENTION

1. Field of the Invention

The present invention relates to an optical parallelism measurement device, and more particularly, to an optical parallelism measurement device with a high test efficiency, compact in size, easily portable and quickly buildable up so as to optimistically lessen the measurement cost.

2. Description of the Prior Art

Keeping pace with the continuous leveling up of the lasers and infrared technique, semiconductor industry and high precision machinery technique, the required refinement of products also becomes more strict. Except the leveling up of the measuring technique, precise parallelism among the relatively moving objects will directly influence the working effect of a machine tool. As the requirement for product quality becomes more strict, and miniaturizing of the commercial product is demanded, the accurate parallelism among the moving objects needs a great improvement. Since the accuracy of parallelism in refinery work has to be kept in the range of several nanometers, or even a few tenths of a nanometer that a commonly employed calibration or measurement devices can not carry out. Use of the common devices leads to inaccurate measuring results or degenerate production quality, or even causes a whole lot of products to turn into a pile of junk. Therefore the measurement of parallelism among the moving objects is a paramount importance.

Meanwhile, it is a common phenomenon that the semi-manual testing method is employed generally by the domestic industry. In the case of asking for a high quality, the effect of the semi-manual testing can never possibly be up-graded, the reason is that the sophisticated products made in the present day must pass the strict examination that most of medium and small scale enterprises in Taiwan fail to improve their high precision measurement system by reason of poor investment ability.

Meanwhile, a modern large sized working platen needs a long guide rail with a length ranging up to tens of meters, calibration of working platen parallelism and horizontal deviation angle carried out with the traditional gauge and parallelometer by ordinary sized machine workshops or larger is by no means sufficient to achieve the required accuracy of several nanometers.

Charge coupled device image treatment technique developed recently is a modernized optical precision measurement system preferably employed by the professional field. The images moving in parallel taken by CCD are analyzed and calculated through image treatment technique, but its accuracy is limited by the hardware construction and resolution which inevitably enlarges the measurement errors. Such a testing equipment has a complicated structure and difficult to set up, its inportability further increases cost for the device of measurement.

Facing up to such technical problems existing in the conventional testing techniques, the inventor of the present invention herein conducted an intensive research based on many years of experience gained through professional engagement in the manufacturing of related products. With continuous experimentation and improvement culminated finally in the development of the progressive structure of an optical parallelism measurement device.

SUMMARY OF THE INVENTION

It is an object of the present invention to provide an optical parallelism measurement device which comprises a laser light source module free from affection of the machine platen structure to cause measure errors so as to achieve high precision measurement.

It is another object of the present invention to provide an optical parallelism measurement device which can be made with low cost, high accuracy, compact in size and good portability, it can be easily set up for performing rapid measurement.

To achieve the above objects, the optical parallelism measurement device provided by the present invention comprises a light source module, a light beam splitting module and a plurality of photoelectric detectors.

The light source module has a light source which is at least able to emit a laser beam. The emission terminal thereof is equipped with a light beam splitting element which can split the laser beam emitted from the light source into two beams perpendicular to each other, one of the two moves parallel with the moving direction of one of moving objects.

The light beam splitting module can receive the other beam moving in the perpendicular direction corresponding to the light beam splitting element of the light source module, moreover, the light beam splitting module can split the light beam at least into one beam which moves parallel with the moving direction of the other moving object.

The plurality of photo electric detectors receive respectively the parallel light beams which being emitted from the light beam splitting element of the light source module and the light beam splitting module.

With this scheme, by means of the technical means described above, the optical parallelism measurement device according to the present invention can effectively measure the parallelism between the moving objects with the aid of the relation between the perpendicular and parallel beams and being able to evade the affection of the working platen. This device has the merit of low production cost, high accuracy, compact in size and excellent portability to be easily installed for carrying out rapid measuring work.

BRIEF DESCRIPTION OF THE DRAWINGS

The drawings disclose the illustrative embodiments of the present invention which serve to exemplify the various advantages and objects hereof, and are as follows.

DETAILED DESCRIPTION OF THE PREFERRED EMBODIMENT

Figure 1:
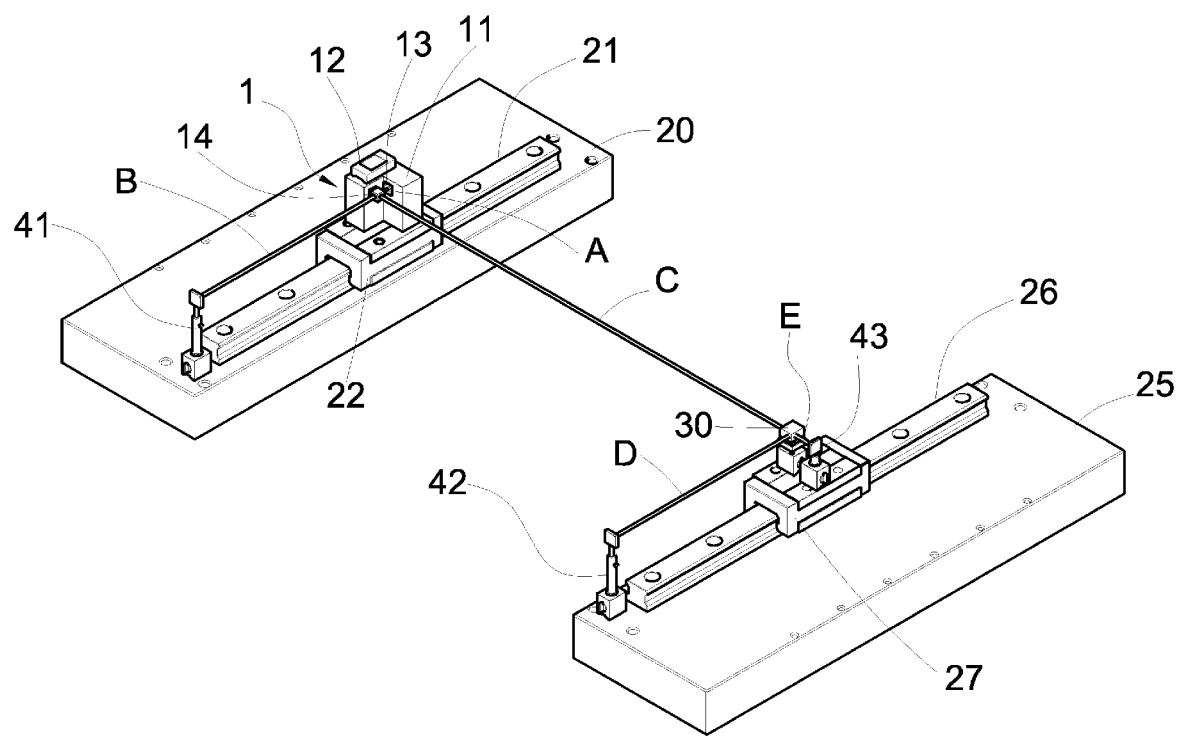
FIG. 1 is a schematic view of the optical parallelism measurement of the present invention for illustration of mutual relationship among the parts in a preferred embodiment.

Referring to FIG. 1, the optical parallelism measurement device comprises a first moving object 22 and a second moving object 27 both slidably loaded on a first guiderail 21 and a second guide rail 26 respectively, and the first and second guiderails 21, 26 are laid on rail foundations 20, 25 respectively. The device further comprises at least a light source module 1, a light beam splitting module 30 and a plurality of photoelectric detectors. The light source module 1 and the light beam splitting module 30 are respectively mounted on the first moving object 22 and the second moving object 27 for measuring parallelism between simultaneously moving first and second moving objects 22 and 27.

Figure 2:
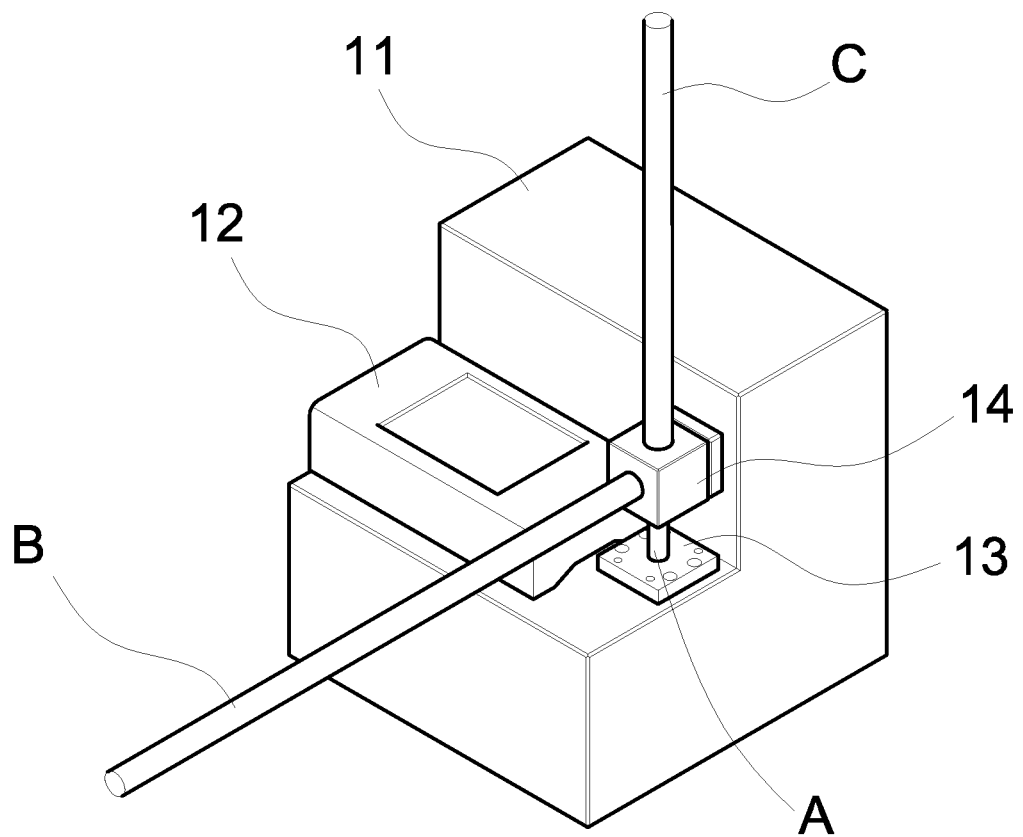
FIG. 2 is a perspective view of the light source module of the present invention.

The scheme of the light source module 1 is shown in FIG. 1 and FIG. 2. The light source module 1 has a foundation 11 on which a level gage 12 is installed so as to adjust the level of the light source module 1. Moreover, the light source module 1 has at least one light source 13 to emit a laser beam A such that the light source module 1 can be a single light source or multiple light sources. A light beam splitting element 14 is provided at the emission terminal of the light source 13 mounted on the foundation 11. The light beam splitting element 14 can be a penta mirror or any other light beam splitting module which can split the laser beam A emitted form the light source 13 into two beams B, C perpendicular to each other, one of them B is parallel to the moving direction of the first moving object 22. The level gage 12 is to adjust the level of the light source module 1 such that both beams B, C may maintain horizontally parallel to the ground surface.

The light beam splitting module 30 mounted on the second moving object 27 can keep parallel with the light beam splitting element 14 corresponding to the light source module 1. The light beam splitting module 30 can be a penta mirror or any light beam splitting module. The light beam splitting module 30 receives the other light beam C of the light source module 1 perpendicular to the moving direction of the first moving object 22, and also splits the light beam C into two light beams D, E perpendicular to each other. The beam D is parallel to the beam B which is parallel to the moving direction of the first moving object 22 such that the beam D is also parallel to the moving direction of the second moving object 27. Another beam E is perpendicular to the beam B which being parallel to the moving direction of the first moving object 22, and the beam E is parallel to the beam C and also on the same axes.

The photoelectric detectors are used to detect the positions of light path of the laser beams B, D, E. In the present invention, three detectors are employed in the main embodiment. These three photoelectric detectors are named first, second and third photoelectric detectors 41, 42, 43 respectively. The first one 41 is provided at the terminal of the first guide rail 21 on the rail foundation 20 so as to receive the parallel beam B emitted by the light beam splitting element 14 of the light source module 1. The second one 42 is provided at the terminal of the second guide rail 26 on the rail foundation 25 so as to receive the parallel beam D emitted by the light beam splitting module 30. The third one 43 is provided at a side of the light beam splitting module 30 mounted on the second moving object 27 so as to receive the beam E emitted by the module 30 perpendicular to the moving direction of the second moving object 27.

With this scheme, an optical parallelism measurement device which can perform a rapid measurement with high accuracy can be obtained.

Figure 3:
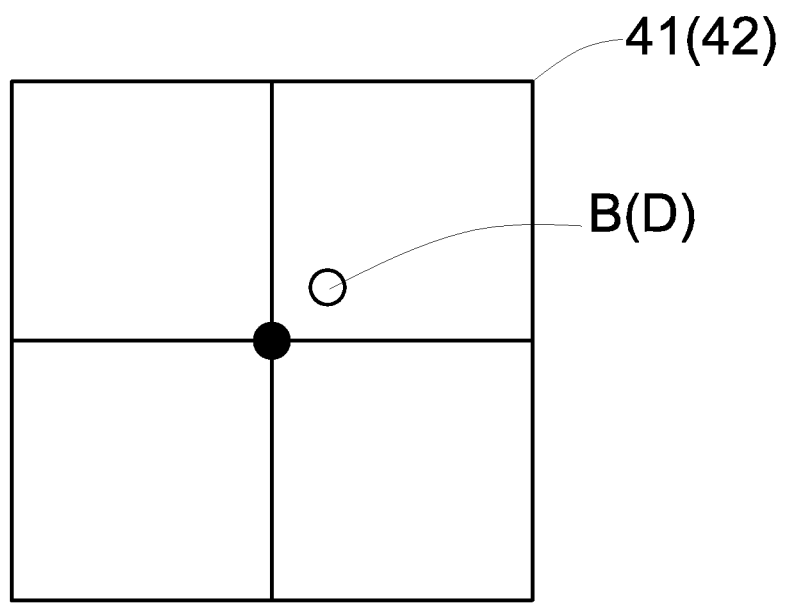
FIG. 3 is a schematic view illustrating position of a testing light spot detected by the photoelectric detector varies according to the error.

Reference should be made to FIG. 1 and FIG. 3 when intending to practically operate the optical parallelism measurement device of the present invention. In measuring parallelism between the first and second moving objects 21 and 27, the light source module 1 and the light beam splitting nodule 30 are respectively mounted on the first moving object 22 and the second moving object 27. Then initiate the light source 13 of the light source module 1 so as to let the parallel light beam B of the light source 13 pass the light beam splitting element 14 and keep parallel to the moving direction of the first moving object 22. On the other hand, by making the perpendicular beam C which passes through the light beam splitting element 14 to radiate the light beam splitting module 30 so as to produce the parallel beam D which is parallel to the moving direction of the second moving object 27 and the perpendicular beam E which is perpendicular to the moving direction of the second moving object 27. Set the first detector 41 at the terminal of the first guide rail 21 which is for the first moving object 22 to slide along so as to receive the parallel beam B which passes through the light beam splitting element 14. Set the second detector 42 at the terminal of the second guide rail 26 which is for the second moving object 27 to slide along so as to receive the parallel beam D which passes through the light beam splitting module 30. Set the third detector 43 at one side of the light beam splitting module 30 mounted on the second moving object 27 so as to receive the perpendicular beam E which passes through the light beam splitting module 30 thereby forming an initial light spot.

Sine the beam B emitted by the light beam splitting element 14 of the light source module 1 is parallel to the beam D which passes the light beam splitting module 30, in case by moving simultaneously the first and second moving objects 22 and 27 and test result shows that parallelism between the two moving objects 22 and 27 has no error, then the light spot positions of the first and second detectors 41 and 42 coincide with the initial light spot and hence it can be concluded that the first and second guide rails 21 and 26 are parallel with each other. If the test result shows that there is no altitude error between the first and second moving objects 22 and 27, and the light spot position of the third detector 43 is tested to be coinciding with the initial light spot position, it can be concluded that there is no altitude error between the first and second guide rails 21 and 26. On the contrary, it is found by testing that there are errors both for parallelism and altitude with the first and second moving objects 22 and 27, the light spot position will vary according to change or error (see FIG. 3), therefore parallelism between the first and second moving objects 22 and 27 can be effectively measured with the aid of both perpendicular and parallel light beams without being affected by the structure of the machine platen. Measurement can be rapidly performed with high accuracy. The device has the advantages of compact in size, easy to carry and build up, and the cost for measurement is very low.

Figure 4:
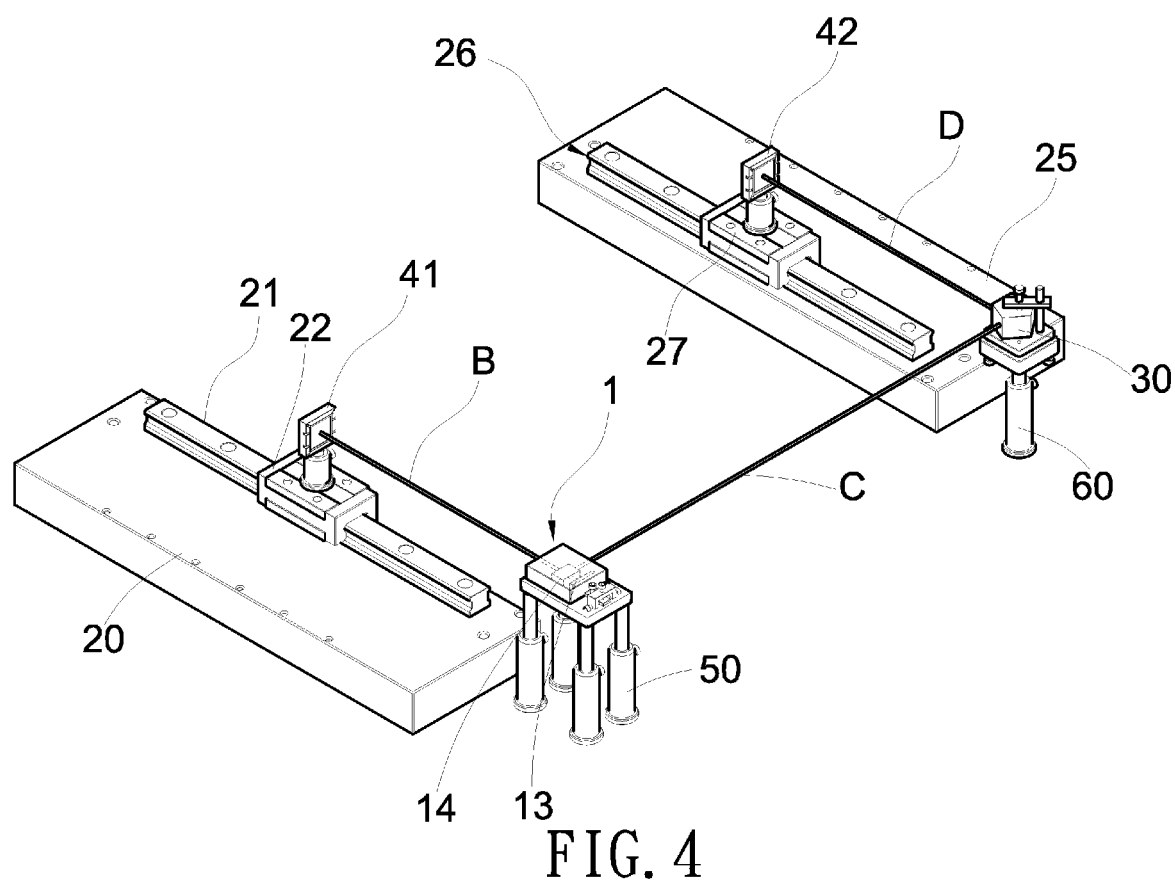
FIG. 4 is a schematic view in another embodiment of the present invention.

FIG. 4 illustrates another embodiment of the present invention. When intending to measure parallelism between a first and a second moving objects 22 and 27 which are respectively mounted on a first and a second guide rails 21 and 26 in slidable state, wherein the former 21 and the latter 26 are mounted on their respective rail foundation 20 and 25. The device comprises at least a light source module 1, a light beam splitting module 30 and a plurality of photoelectric detectors. The light source module 1 is mounted on a light source lift pad 50 which is provided in front of the foundation 20 for the first moving object 22, the light beam splitting module 30 is mounted on a light beam splitting lift pad 60 which is provided in front of the foundation 25 for the second moving object 27 such that the light source module 1 and the light beam splitting module 30 may produce beams B and D parallel with each respectively thereby able to measure parallelism between the first and second moving objects 22 and 27 moving independently.

The light source module 1 has a light source 13 to emit a laser beam A, and a light splitting element 14 is provided at the emitting terminal of a light source 13 on a foundation 11 so as to split the laser beam A emitted from the light source 13 into two beams B and C perpendicular to each other. Of them the beam B is parallel to the moving direction of the first moving object 22. The light beam splitting module 30 is parallelly corresponding to the light beam splitting element 11 of the light source module 1, the light beam splitting module 30 is to receive another beam C which is perpendicular to the moving direction of the first moving object 22 of the light source module 1, and the light beam splitting module 30 can turn the beam C into the beam D parallel to the beam B which is parallel to the moving direction of the first moving object 22 such that the beam D also parallel to the moving direction of the second moving object 27.

Plural detectors are employed to detect the light spot positions of the laser beams. In this embodiment two detectors are used which are defined a first detector 41 and a second detector 42. The former 41 is set on the first moving object 22 which is loaded on the first guide rail 21 of the rail foundation 20 so as to receive the parallel beam B which is emitted from the light beam splitting element 14 of the light source module 1. The latter 42 is set on the second moving object 27 which is loaded on the second guide rail 26 of the rail foundation 25 so as to receive the parallel beam D emitted form the light beam splitting module 30.

In this way when intending to measure the parallelism between the first and second moving objects 22 and 27, set the light source module 1 on the light source lift pad 50, and the light beam splitting module 30 on the light beam splitting lift pad 60. Initiate the light source 13 of the light source module 1 so as to keep the parallel beam B of the light source 13 which passes through the light beam splitting element 14 parallel to the moving direction of the first moving object 22, the perpendicular beam C which passes through the light beam splitting element 14 radiates the light beam splitting module 30 to produce the parallel beam D parallel to the moving direction of the second moving object 27, and the parallel beam B and the parallel beam D are parallel with each other. Then set the first detector 41 on the first moving object 22 so as to receive the parallel beam B from the light beam splitting element 14, and set the second detector 42 on the second moving object 27 so as to receive the parallel beam D from the light splitting module 30 thereby forming an initial light spot.

Sine the beam B emitted by the light beam splitting element 14 of the light source module 1 is parallel to the parallel beam D which passes the light beam splitting module 30, by respectively moving the first or second moving objects 22, 27, and finding that there is no parallelism error produced between the two moving objects 22 and 27, it means that the light spot position measured is coinciding with initial light spot position therefore the first and second guide rails 21 and 26 are proved to be parallel with each other. On the contrary, there is a parallelism error measured between the first and second moving objects 22 and 27, the measured light spot positions will vary according to change of error (see FIG. 3) such that the parallelism between the first and second moving objects 22 and 27 can be figured out effectively, advantageously and practically.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An optical parallelism measurement device comprising:
   a light source module having at least one light source to emit a laser beam, wherein an emission terminal of said light source is equipped with a light beam splitting element which can split said laser beam emitted from said light source into two beams perpendicular to each other, one of the two beams moves parallel with a moving direction of one of moving objects;
   a light beam splitting module to receive the other beam moving in the perpendicular direction corresponding to said light beam splitting element of said light source module, moreover, said light beam splitting module can split said light beam at least into one beam which moves parallel with the moving direction of the other moving object; and
   a plurality of photoelectric detectors to receive respectively the parallel light beams which are emitted from said light beam splitting element of the light source module and said light beam splitting module.

2. The device of claim 1, wherein said light source module and said light beam splitting module are respectively mounted on two moving objects, and said photoelectric detectors are respectively provided at and fixed to the front end of said moving objects so as to move simultaneously and measure the parallelism between said two moving objects.

3. The device of claim 2, wherein said light beam splitting module can produce additional light beam which moves in perpendicular direction, and said light beam splitting module has another photoelectric detector on its moving object for receiving said light beam so as to prevent being affected by the structure of the machine working platen with the aid of said parallel or perpendicular beams.

4. The device of claim 1, wherein said light source module is mounted on a light source lift pad which is provided in front of the moving object, said light beam splitting module is mounted on a light beam splitting lift pad which is provided in front of the other moving object, and each of said two moving object has a photoelectric detector set on it to receive two parallel beams which are parallel to the moving direction of said two moving objects.

5. The device of claim 1, wherein said light source module has a foundation form mounting a light source and a level gage is provided on said foundation for adjusting the horizontalness of said light source module.

6. The device of claim 1, wherein the light source of said light source module is single or plural.

7. The device of claim 1, wherein said light beam splitting element is a penta mirror.

8. The device of claim 1, wherein said light beam splitting module is a penta mirror.

* * * * *